(12) United States Patent  (10) Patent No.: US 7,750,615 B2
Jung et al.  (45) Date of Patent: Jul. 6, 2010

(54) BURST MODE OPERATION IN A DC-DC CONVERTER

(75) Inventors: Sang-Hwa Jung, Seoul (KR); Kyung-Goo Lee, Incheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 392 days.

(21) Appl. No.: 11/888,480

(22) Filed: Aug. 1, 2007

(65) Prior Publication Data

US 2008/0175029 A1  Jul. 24, 2008

(30) Foreign Application Priority Data

Jan. 18, 2007  (KR) ...................... 10-2007-0005484

(51) Int. Cl.
 *G05F 1/40* (2006.01)
(52) U.S. Cl. ...................................... 323/282
(58) Field of Classification Search ................. 323/273, 323/280, 282, 283, 288
 See application file for complete search history.

(56) References Cited

U.S. PATENT DOCUMENTS 6,724,174 B1  4/2004 Esteves et al.
7,030,596 B1 *  4/2006 Salerno et al. .............. 323/282
2008/0043504 A1 *  2/2008 Ye et al. ....................... 363/97

* cited by examiner

*Primary Examiner*—Adolf Berhane
(74) *Attorney, Agent, or Firm*—Sidley Austin LLP

(57) ABSTRACT

The present invention relates to a converter and a driving method thereof. The converter uses an input voltage to generate an output voltage by a main switch's switching and applies power to a load, senses the current flowing to the main switch to generate a sense voltage, uses a first voltage corresponding to the current applied to the load and a sawtooth waveform signal having a first frequency to control a group frequency of the burst mode, controls the main switch's turn-on timing, and uses the first voltage and the sense voltage to determine whether to turn off the main switch, thereby controlling the main switch's switching. The converter determines the start and end of the period for switching according to the result of comparing the first voltage and the sawtooth waveform signal. Therefore, a converter for having a constant group frequency, preventing audible noise, and preventing output voltage ripple, and a driving method thereof, are provided.

14 Claims, 5 Drawing Sheets

(a)

(b)

BURST MODE OPERATION IN A DC-DC CONVERTER

CROSS-REFERENCE TO RELATED APPLICATION

This application claims priority to and the benefit of Korean Patent Application No. 10-2007-0005484 filed in the Korean Intellectual Property Office on Jan. 18, 2007, the entire content of which is incorporated herein by reference.

BACKGROUND

1. Field of the Invention

The present invention relates to a converter. More particularly, the present invention relates to a burst mode converter and a driving method thereof.

2. Description of the Related Art

A burst mode is a driving mode for a converter to output power through switching for a predetermined time, stop the switching for another predetermined time, and repeat the process so as to reduce power consumption when a load connected to the converter is low.

The conventional hysteretic burst mode converter has a simple structure, but it generates audible noise. The hysteretic burst mode converter uses a hysteresis comparator. In the case of using the hysteresis comparator, a group frequency is reduced in the burst mode. The group frequency represents a frequency corresponding to a group period. The group period is defined as the period which includes the period for outputting power through switching in the burst mode and the period for stopping the switching.

FIG. 1 shows a control signal (Vg) for determining an on/off of a main switch generated by a load connected to an output terminal of the conventional converter. The converter controls output power by using the main switch's on/off operation. The group frequencies of the control signal (Vgate) are indicated on the right hand side of FIG. 1, for respective loads. The respective load values are indicated on the left-hand side of FIG. 1. The control signal's time evolution illustrate the period of the switching operation. The direction of the arrow indicates on the left hand side indicates decreasing loads and increasing load currents. As shown in FIG. 1, the group frequency increases as the load is reduced. The group frequency bandwidth (1 Khz-14 Khz) is in the audible frequency bandwidth, generating inconvenience to a user because of the noise that is generated when the converter is operated.

Also, as the group frequency is reduced, a ripple of an output voltage of the converter is increased.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention include a converter and a driving method thereof having a predetermined group frequency in the burst operation, irrespective of loads.

In one embodiment, a converter may include: a power supply for generating an output voltage by using an input voltage by a switching operation of the main switch, and transmitting power to a load; a current sensor for sensing the current flowing to the main switch to generate a sense voltage; a burst mode controller for controlling a burst mode group frequency by using a first voltage corresponding to the current transmitted to the load and a sawtooth waveform signal having a first frequency; and a PWM controller for controlling the main switch's turn-on timing, and determining the main switch's turn-off by using the first voltage and the sense voltage to thus control the main switch's switching operation.

The burst mode controller determines a start and an end of a period for generating the switching operation according to the result of comparing the first voltage and the sawtooth waveform signal.

An embodiment of the burst mode controller may include an oscillator for generating the sawtooth waveform signal, generates the first voltage by using the result of integrating the difference between a second voltage corresponding to the output voltage and a reference voltage, and generates a burst mode control signal according to the result of comparing the first voltage and the sawtooth waveform signal.

An embodiment of the burst mode controller may include a first resistor having a first terminal connected to the output terminal; a second resistor having a first terminal connected to a second terminal of the first resistor; a trans-conductance amplifier for receiving a voltage at a node where the first resistor and the second resistor meet and the reference voltage; and a first comparator for receiving the first voltage and the sawtooth waveform signal, comparing the first voltage and the sawtooth waveform signal, and generating the burst mode control signal according to the comparison result.

An embodiment of the burst mode controller may include: a capacitor having a first terminal connected to an output terminal of the trans-conductance amplifier; and a third resistor having a first terminal connected to a second terminal of the capacitor and a grounded second terminal.

An embodiment of the PWM controller may include: a logical operator for performing a logical operation on the burst mode control signal and a pulse signal to generate a first signal; an on time pulse generator for generating the pulse signal; a second comparator for receiving the first voltage and the sense voltage, and generating a second signal according to the result of comparing the first voltage and the sense voltage; and an SR flip-flop for receiving the first signal through a set terminal and the second signal through a reset terminal, and generating a gate driver control signal according to logical values of the first signal and the second signal.

The first voltage is less than the peak of the sawtooth waveform signal, and a frequency of the pulse signal that is generated for a first period in which the sawtooth waveform signal is less than the first voltage, is same with the frequency of a pulse signal that is generated for another period excluding the first period.

The PWM controller may further include a gate driver for determining the main switch's on/off according to the gate driver control signal, and the SR flip-flop generates a gate driver control signal for turning on the main switch when the first signal is at a second level and generates a gate driver control signal for turning off the main switch when the second signal is at a third level.

The first level, the second level, and the third level are a high level, and the logical operator performs an AND logical operation.

An embodiment of the current sensor may include a sensor for sensing the current flowing to the main switch; a slope compensation/offset voltage unit for generating a slope compensation and offset voltage; and an adder for summing the offset voltage and a voltage corresponding to the current flowing to the main switch to generate the sense voltage.

In another embodiment of the present invention, a method for driving a converter for converting an input voltage into an output voltage according to switching by a main switch may include a) controlling a switching on period and a switching off period in the burst mode by using a first voltage corresponding to the output voltage and a sawtooth waveform signal having a first frequency; b) controlling the main switch to be turned on at least for a first period during the switching on period; c) sensing a first current flowing to the main switch; and d) comparing a sense voltage corresponding to the first current and a first voltage corresponding to the output voltage, and determining whether to turn off the main switch.

Step a) may include amplifying a difference between a reference voltage and a voltage that is generated by dividing the output voltage to generate the first voltage; and identifying the switching on period and the switching off period of the burst mode according to the result of comparing the first voltage and the sawtooth waveform signal.

Step b) may include performing a logical operation on a burst mode control signal corresponding to the result of comparing the first voltage and the sawtooth waveform signal and a pulse having an enable level for the first period.

Step c) may include generating the sense voltage by adding an offset voltage to a voltage corresponding to the current flowing to the main switch. Step d) may include comparing the first voltage and the sense voltage to determine whether to turn off the main switch.

DETAILED DESCRIPTION

Figure 1:
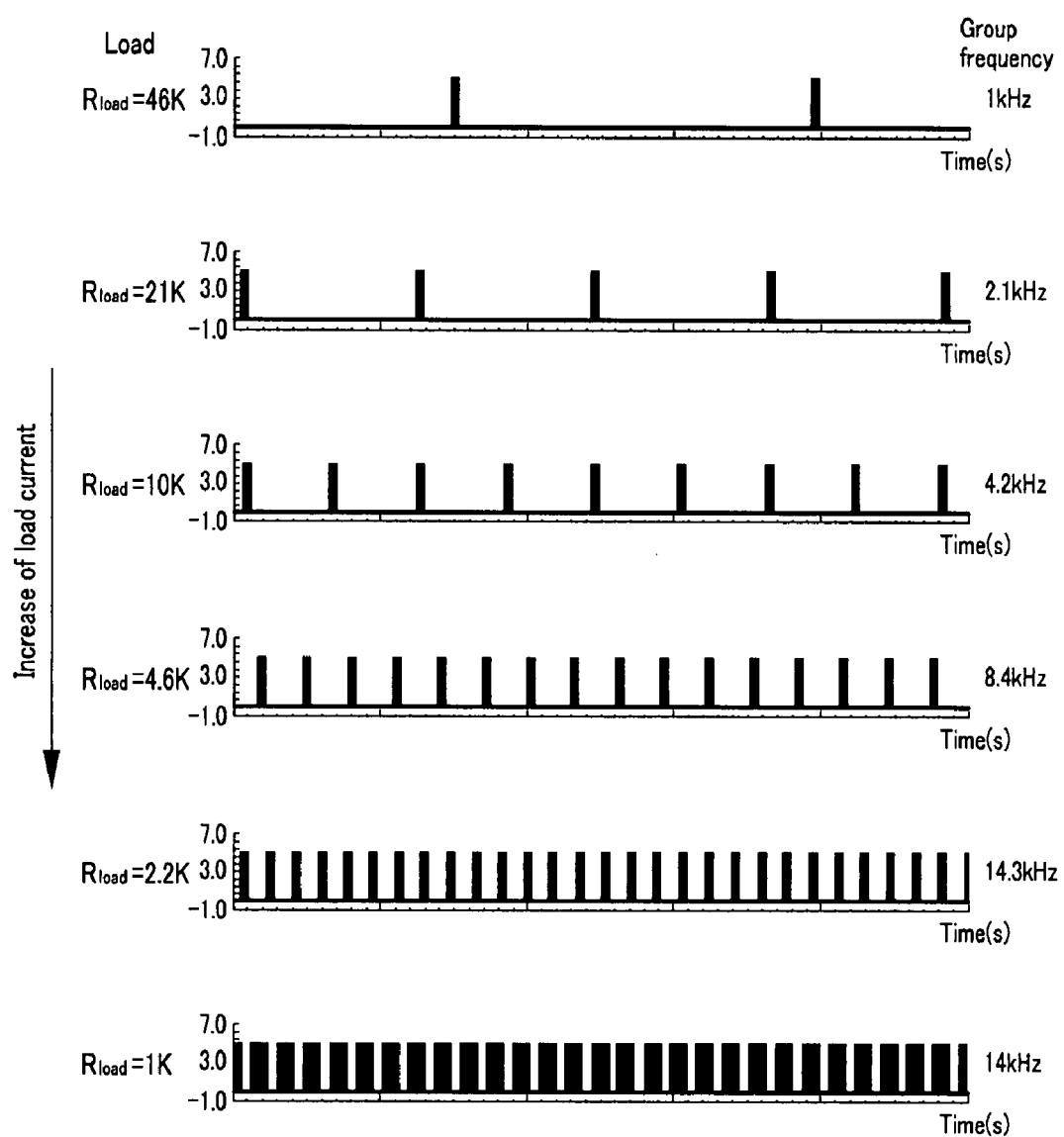
FIG. 1 shows a control signal for determining a main switch's on/off generated by a load connected to an output terminal of the conventional converter.

In the following detailed description, only certain exemplary embodiments are shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims that follow, when it is described that an element is "coupled" to another element, the element may be "directly coupled" to the other element or "electrically coupled" to the other element through one or more additional elements.

A converter and its driving method will be described in detail with reference to the drawings. A switching operation will indicate an operation in which a main switch is turned on, then turned off after maintaining the on state for a predetermined time, and it maintains the off state until it is turned on again.

Figure 2:
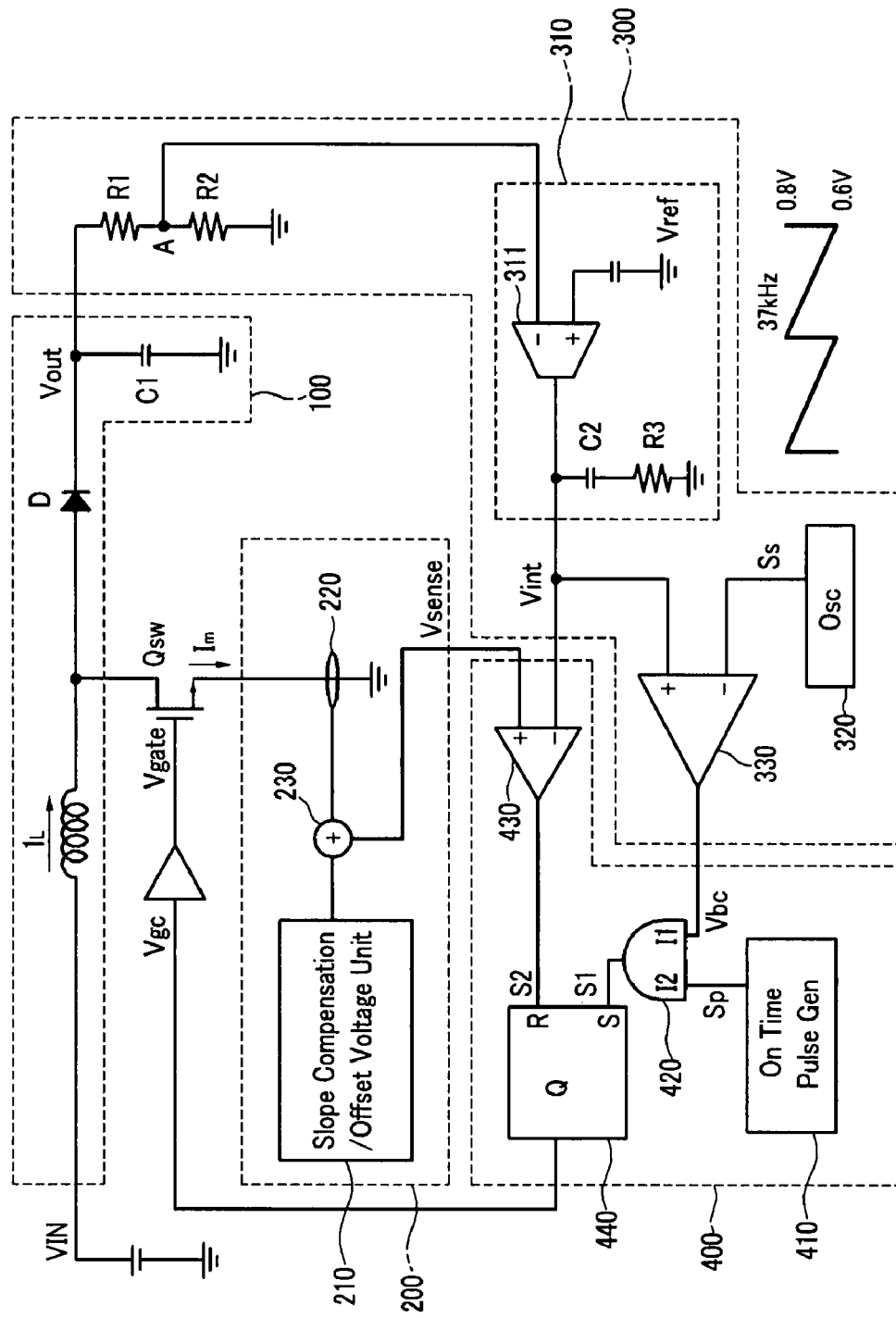
FIG. 2 shows an entire configuration of a converter.

FIG. 2 shows a configuration of a converter. The converter may include a power supply 100, a current sensor 200, a burst mode controller 300, a PWM controller 400, a gate driver 500, and a main switch Qsw.

The power supply 100 may receive an input voltage Vin and supply an output voltage Vout to an output terminal by switching the main switch Qsw. The power supply 100 may include an inductor L, a diode D, and a capacitor C1. A first terminal of the inductor L can receive an input voltage Vin, and a second terminal can be connected to a first terminal of the main switch Qsw and an anode of the diode D. A cathode of the diode D can be connected to a first terminal of the capacitor C1. A second terminal of the capacitor C1 can be grounded.

The current sensor 200 can sense a current Im flowing through the main switch Qsw to generate a sense voltage Vsense. The current sensor 200 may include a slope compensation/offset voltage unit 210, a hall sensor 220, and an adder 230. The hall sensor 220 can sense the current Im to output a voltage VS corresponding to the sensed current Im to the adder 230. The slope compensation/offset voltage unit 210 can generate an offset voltage Vf to the adder 230. When the duty ratio is greater than a predetermined value, for example, 0.5 in the current mode DC-DC converter, sub-harmonic oscillation occurs to consecutively change the duty ratio. Slope compensation can be applied to prevent this, and the slope compensation/offset voltage unit 210 can compensate the slope of the sensed current with a greater slope compared to the slope of the output voltage of an integrator, thereby preventing the sub-harmonic oscillation. The adder 230 can add the voltage VS and the offset voltage Vf to generate the sense voltage Vsense to the PWM controller 400. The offset voltage Vf can have a voltage level for establishing an operational point of an output terminal node of a trans-conductance amplifier 310. The offset voltage Vf can assume a predetermined value, for example, 0.8V. Accordingly, the sense voltage Vsense can be 0.8V when the voltage VS is 0V when no current flows through the main switch Qsw.

The burst mode controller 300 may control the group frequency of the converter that is operated in the burst mode according to the output voltage Vout. In detail, the period in which switching is generated in the group period will be called a switching-on period, and the period in which switching is not generated will be called a switching-off period. The group frequency can be determined according to the sum of the switching-on period and the switching-off period. The burst mode controller 300 may include a resistor R1, a resistor R2, the trans-conductance amplifier 310, a reference voltage source Vref, a capacitor C2, a resistor R3, an oscillator 320, and a first comparator 330.

When the load at an output terminal is reduced, a current ir flowing through a path formed by the resistors R1 and R2, coupled in series, is increased. When the load at the output terminal is increased, the current ir is reduced. The voltage at the node A at which the resistors R1 and R2 are coupled becomes greater as the load decreases, and becomes lesser as the load increases. The voltage Va of the node A can be applied to an inverting terminal (−) of the trans-conductance amplifier 310, and a voltage of the reference voltage source Vref can be applied to a non-inverting terminal (+) of the trans-conductance amplifier 310.

The trans-conductance amplifier 310 may include an amplifier 311 for receiving the reference voltage source Vref through a non-inverting terminal (+) and the voltage Va through an inverting terminal (−), a capacitor C2, and a resistor R3. The amplifier 311 may output a signal SA that is generated by amplifying the voltage difference between the voltage of the reference voltage source Vref and the voltage Va by a gain. The voltage of the signal SA may vary according to a current applied to the load. In detail, when the load is reduced and the current ir is increased, the voltage applied to the inverting terminal (−) may be increased and the voltage of the signal SA reduced. When the load is increased and the current ir is reduced, the voltage applied to the inverting terminal (−) may be reduced and the voltage of the signal SA increased. A first terminal of the capacitor C2 may be coupled to an output terminal of the amplifier 311, and a second terminal of the capacitor C2 can be coupled to a first terminal of the resistor R3. A second terminal of the resistor R3 can be grounded. The capacitor C2 may function as a low pass filter for the signal transmitted from the output terminal of the amplifier 311 to eliminate a radio frequency component of the signal SA, and the resistor R3 may function as a zero in the transfer function of the output signal SA for the input signal of the trans-conductance amplifier 310. The trans-conductance amplifier 310 can integrate the difference between the reference voltage Vref and the voltage Va to generate the signal SA. The voltage Vint of the generated signal SA can be transmitted to the first comparator 330 and the PWM controller 400. The voltage Vint has a waveform substantially similar to the voltage waveform of the signal SA, and the voltage Vint is reduced as the load is reduced and is increased as the load is increased. In some embodiments, Vint can be generated by low pass filtering the signal SA.

The oscillator 320 can have a constant frequency and generate a sawtooth waveform signal Ss, having a first voltage and a second voltage as a maximum voltage and a minimum voltage. The first voltage and the second voltage of the oscillator 320 can assume predetermined values, for example, 0.8V and 0.6V, respectively. Other values can be applied in various embodiments for the maximum voltage and the minimum voltage. In some embodiments the maximum voltage of the sawtooth waveform signal Ss can be less than the offset voltage Vf of the current sensor 200. The oscillator 320 can generate a sawtooth waveform signal Ss having a frequency for example, of 37 kHz. In other embodiments, other suitable frequencies can be used.

The first comparator 330 can receive the voltage Vint through a non-inverting terminal (+) and the sawtooth waveform signal Ss through an inverting terminal (−). The first comparator 330 may compare the voltage Vint and the voltage of the sawtooth waveform signal Ss, and generate a burst mode control signal Vbc according to the comparison result. When the voltage Vint is greater than the voltage of the sawtooth waveform signal Ss, the burst mode control signal Vbc can assume a high level, and when the voltage Vint is less than the voltage of the sawtooth waveform signal Ss, a low level. The first comparator 330 may transmit the burst mode control signal Vbc to the PWM controller 400.

The PWM controller 400 may include an on-time pulse generator 410, an AND gate 420, a second comparator 430, and an SR flip-flop 440.

In the burst mode operation, the on-time pulse generator 410 can generate a signal Sp for determining the time when the main switch is turned on in the switching-on period. The signal Sp can have a high-level pulse for turning on the main switch Qsw. The high level pulse can have a high level during a predetermined period. The predetermined period may guarantee the on-time of the main switch Qsw. The on-time pulse generator 410 may generate high-level pulse signals at regular intervals during a period in which the sawtooth waveform signal Ss is less than the voltage Vint. However, in the case of a light load, the frequency of the signal Sp may be low. In detail, the signal Sp is a pulse signal for determining the time when the main switch is turned on with a predetermined frequency. During the period in which the sawtooth waveform signal is less than the voltage Vint, that is, when the load is light, the frequency of the signal Sp is reduced. When the high frequency is maintained in the case of the light load, a switching loss cannot be reduced. To solve this problem, the on-time pulse generator 410 can change the frequency of the signal Sp from high frequency to low frequency during the period in which the sawtooth waveform signal Ss is less than the voltage Vint so as to reduce the loss.

The AND gate 420 may receive the signal Sp and the burst mode control signal Vbc, and generate a high-level first signal S1 when the two signals are high level. The first signal S1 can be input to a set terminal of the SR flip-flop 440.

The second comparator 430 may receive a sense voltage Vsense through a non-inverting terminal (+), and a voltage Vint through an inverting terminal (−). The second comparator 430 may compare the sense voltage Vsense and the voltage Vint, and generate a second signal S2 according to the comparison result. The second signal S2 becomes a high level when the sense voltage Vsense is greater than the voltage Vint, and it becomes a low level when the sense voltage Vsense is less than the voltage Vint. The second signal S2 can be input to a reset terminal R of the SR flip-flop 440.

The SR flip-flop 440 may generate a gate driver control signal Vgc according to the first signal S1 and the second signal S2 input to the set terminal S and the reset terminal R. When the first signal S1 is a high level, the SR flip-flop 440 can generate a high level gate driver control signal Vgc at an output terminal Q. The high level gate driver control signal Vgc is maintained at the high level until a high-level second signal S2 is input to the reset terminal R. When the high level second signal S2 is input to the reset terminal R, the SR flip-flop 440 can generate a low-level gate driver control signal Vgc at the output terminal Q.

In correspondence to the high level gate driver control signal Vgc, the gate driver 500 can transmit a gate signal Vgs to the main switch Qsw for turning it on, and in correspondence to the low level gate driver control signal Vgc, the gate driver 500 may transmit a gate signal Vgs to the main switch Qsw for turning off the main switch Qsw. The main switch Qsw can be an n-channel type transistor, and it has a gate terminal as a control terminal, and a drain terminal and a source terminal as two terminals. The main switch Qsw can be turned on when the voltage difference between the gate terminal and the source terminal is greater than a threshold voltage. The gate signal Vgs is a voltage that can be high enough to turn on the main switch Qsw, or it is a voltage that is low enough to turn off the main switch Qsw.

Figure 3:
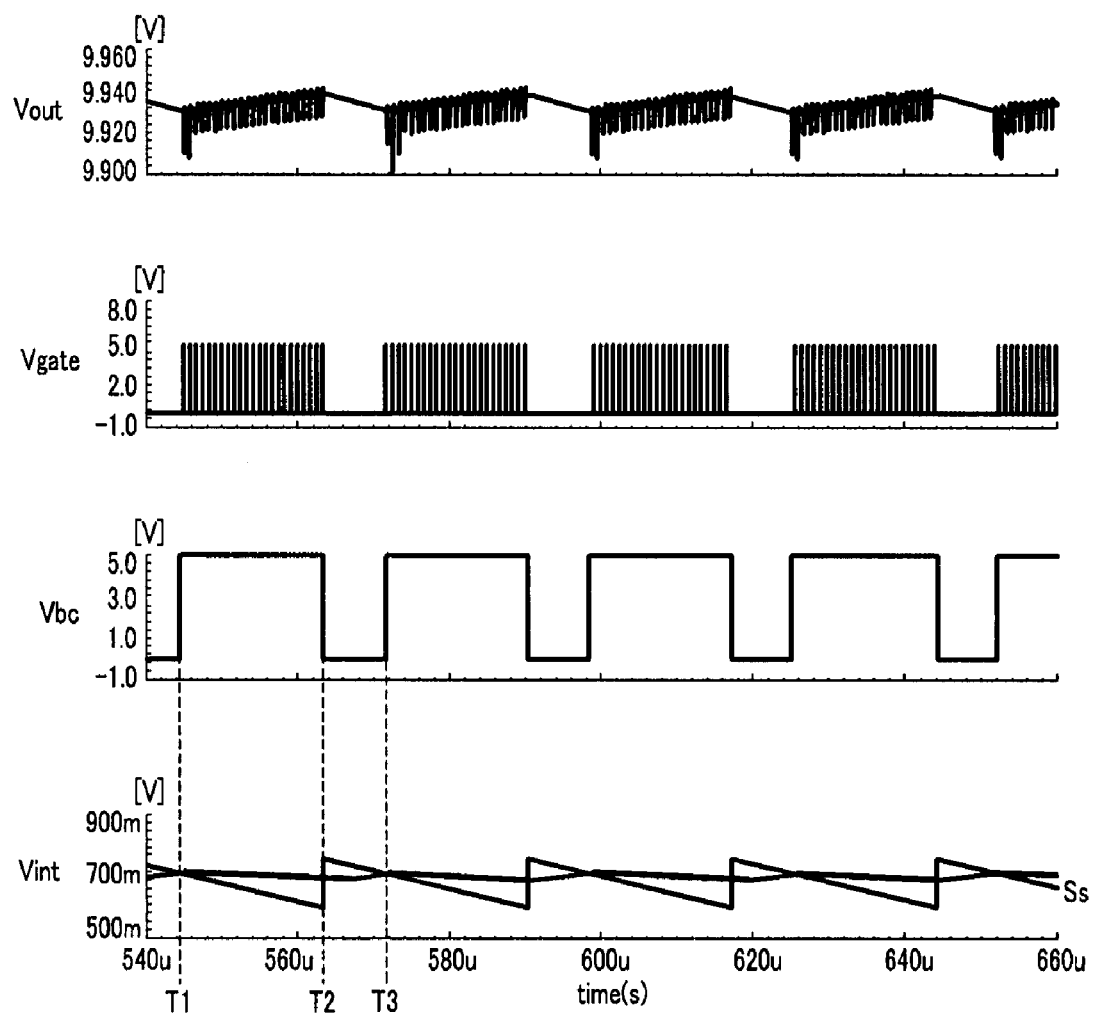
FIG. 3 shows a waveform diagram for the converter's output voltage (Vout), gate control signal (Vgs), burst mode control signal (Vbc), and voltage (Vint).

FIG. 3 illustrates an operation of the converter. FIG. 3 shows a waveform diagram of the output voltage Vout, the gate control signal Vgs, the burst mode control signal Vbc, and the voltage Vint of the converter. The burst mode control signal Vbc may become a high level at a time T1 when the voltage Vint crosses the voltage of the sawtooth waveform signal Ss. Since the high-level burst mode control signal Vbc is applied to the input terminal 11 of the AND gate 410, the first signal S1 becomes synchronized with the signal Sp at the time when the signal Sp assumes a high-level. When a high-level first signal S1 is applied to the set terminal S of the SR flip-flop 440, a high-level gate driver control signal Vgc is generated and applied to the gate driver 500. The gate driver 500 can generate and transmit a gate signal Vgate for turning on the main switch Qsw according to the high-level gate driver control signal Vgc. When the main switch Qsw is turned on, the hall sensor 210 can sense the current Im and the sense voltage Vsense is correspondingly increased. When the sense voltage Vsense becomes greater than the voltage Vint, a high-level second signal S2 can be input to the reset terminal R of the SR flip-flop 440. Correspondingly, the SR flip-flop 440 may transmit a low-level gate driver control signal Vgc to the gate driver 500. The gate driver 500 can transmit a gate signal Vgate for turning off the main switch Qsw according to a low-level gate driver control signal Vgc. After the main switch Qsw is turned off, the main switch Qsw is turned on again substantially at the time when the signal Sp has a high-level pulse. In a like manner, the switching operation is repeated during the period of T1-T2, during which the output voltage Vout is increased by the switching and the voltage Vint is reduced.

At the time T2, the voltage of sawtooth waveform signal Ss can become greater than the voltage Vint, and the burst mode control signal Vbc can become a low level. Since a low-level burst mode control signal Vbc is input to the input terminal I1 of the AND gate 420, the AND gate 420 generates a low-level first signal S1 irrespective of the signal input to the input terminal I2. After T2, the sense voltage Vsense can assume its predetermined value, for example, 0.8V, since the main switch Qsw is turned off. During the period of T2-T3, the second comparator 430 generates a high-level second signal S2 since the voltage Vint is less than its predetermined value, for example, 0.8V. Since the first signal S1, input to the set terminal S of the SR flip-flop 440, is a low level and the second signal S2 input to the reset terminal R is a high level, the SR flip-flop 440 can transmit a low-level gate driver control signal Vgc to the gate driver 500 at the output terminal Q. The gate driver 500 may transmit a gate signal Vgate for turning off the main switch Qsw. The main switch Qsw can remain in the turn-off state during the period of T2-T3, and can repeat the operation of the period T1-T2 starting from the time T3 when the voltage Vint becomes greater than the sawtooth waveform signal Ss.

Accordingly, in the described converter, the period including the switching-on period T1-T2 for the main switch Qsw to perform the switching operation and the switching-off period T2-T3 for the main switch Qsw to perform no switching operation and maintain the turn-off state is a group period. The frequency corresponding to the inverse of the group period is a group frequency. As it is clear from the description, the group frequency of the converter's burst operation is essentially the same frequency as that of the sawtooth waveform signal Ss, output by the oscillator 320, irrespective of the load connected to the output terminal. That is, the group frequency of the gate signal Vgate of the converter and the output voltage Vout correspond to the frequency of the sawtooth waveform signal Ss. Thus, the group frequency of the converter's gate signal Vgate and the output voltage Vout can be controlled by controlling the frequency of the sawtooth waveform signal Ss. This way, a converter that is operable by a group frequency greater than the frequency of the audible noise bandwidth and a driving method thereof can be provided, and a converter for controlling a group frequency for reducing the output voltage's ripple and a driving method thereof can be provided.

Figure 4:
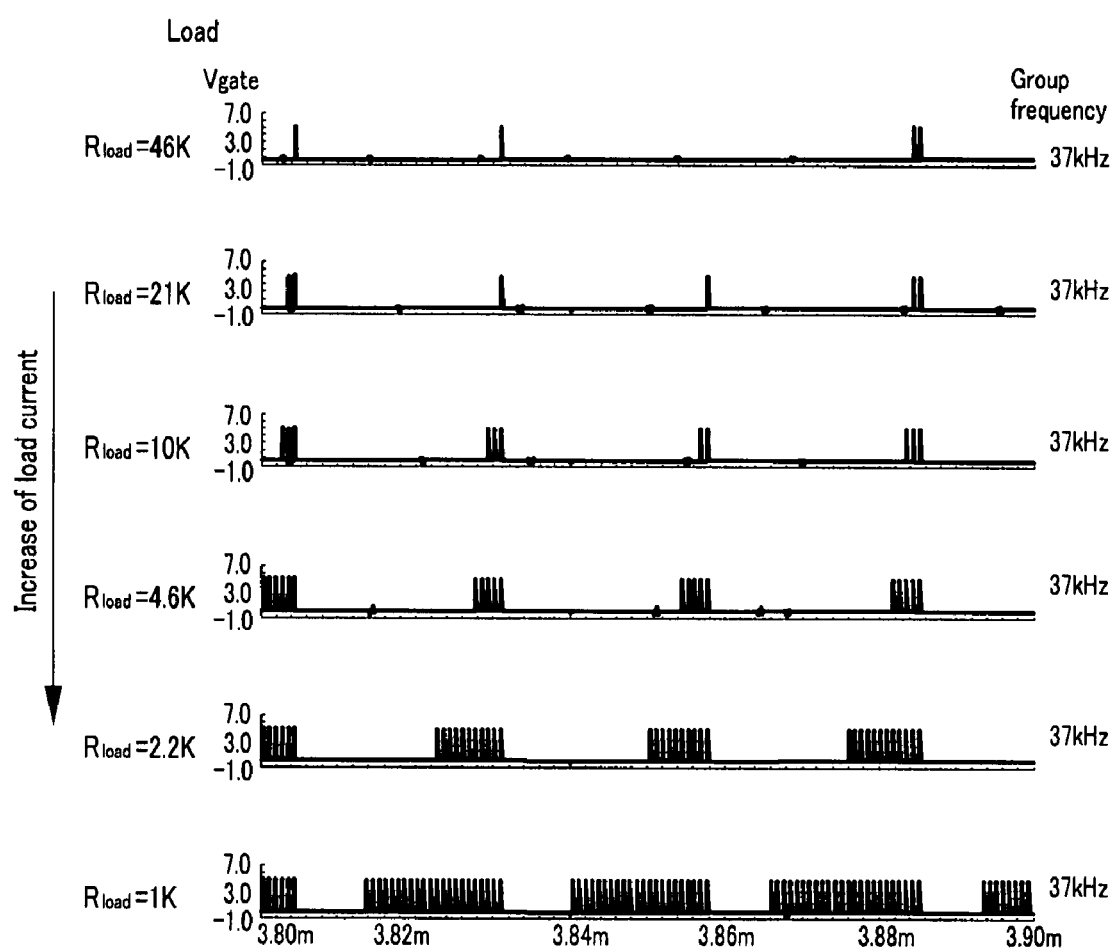
FIG. 4 shows a group frequency of a gate signal generated according to the load connected to the converter.

FIG. 4 illustrates the operation of the converter with an essentially constant group frequency. FIG. 4 shows a group frequency of the gate signal generated according to the load connected to the converter.

FIG. 4 illustrates a sequence of loads in decreasing order of 46K, 21K, 10K, 4.6K, 2.2K, and 1K. As the load is reduced, the current applied to the load is increased. As the current transmitted to the load is increased, the voltage transmitted to the inverting terminal (−) of the trans-conductance amplifier 310 is reduced and the voltage Vint is increased. Therefore, the period in which the voltage Vint has a level greater than that of the sawtooth waveform signal Ss is increased, and the switching-on period is increased.

In the case of conventional converters, shown in FIG. 1, the group frequency varies by the load. In contrast, in embodiments of the above converter the group frequency remains essentially constant at around 37 kHz.

Figure 5:
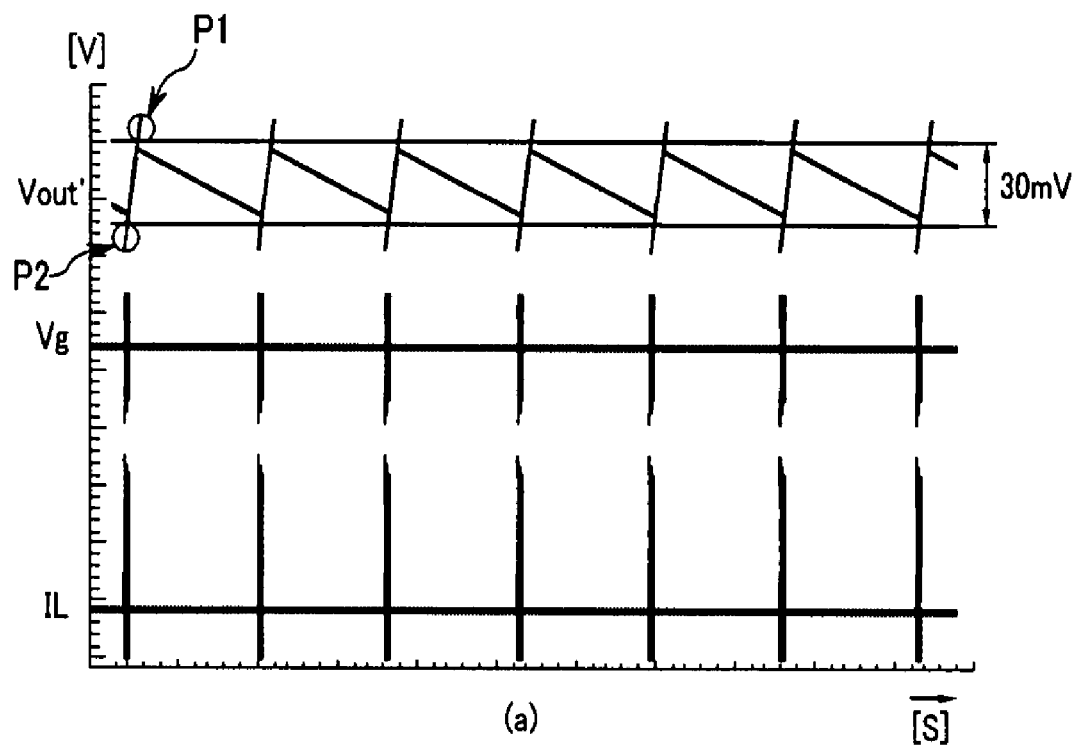
FIG. 5 shows a waveform diagram for an output voltage, a gate control signal, and a current applied to an inductor with respect to time when a conventional converter and a converter are connected to the same load.
Figure 5:
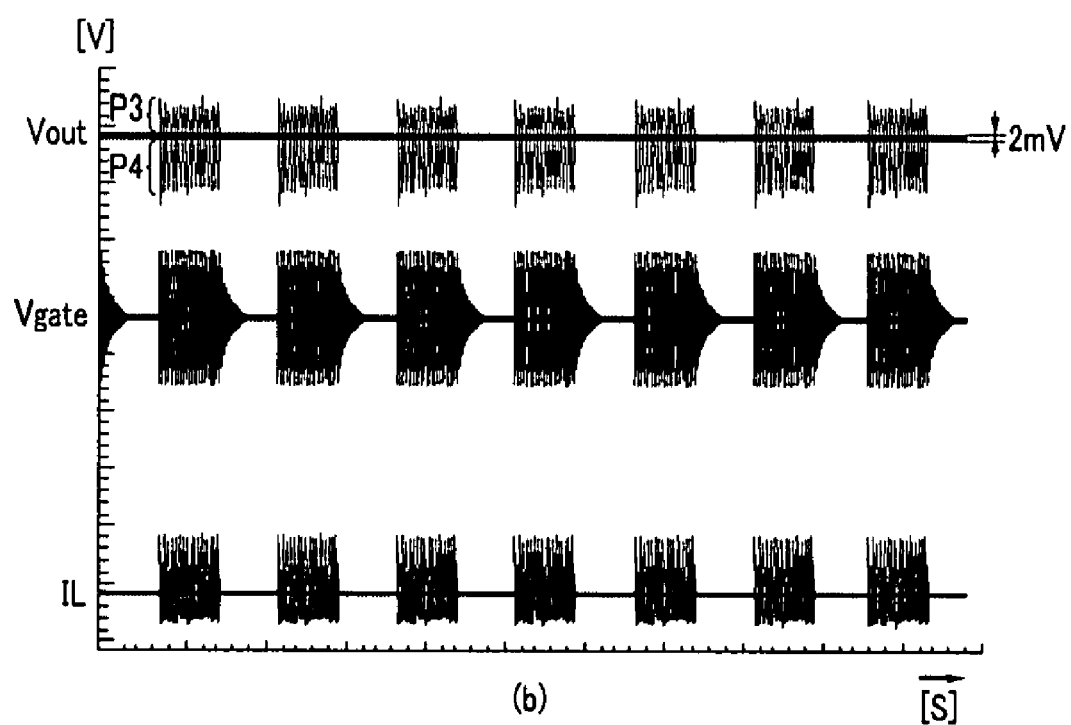

FIG. 5 shows a waveform for the output voltage, the gate control signal, and the current of the inductor L for a conventional converter and for embodiments of the above converter, when they are connected to the same load.

FIG. 5(a) shows an output voltage Vout', a gate control signal Vg, and a current IL' flowing through an inductor L of a conventional converter. FIG. 5(b) shows an output voltage Vout, a gate control signal Vgate, and a current IL flowing to an inductor L in an embodiment of the present invention. In this particular embodiment, the markers on the vertical voltage axes of FIGS. 5(a) and (b) illustrating the waveforms of the output voltages Vout' and Vout, and the gate control signals Vg and Vgate, are separated by 4 mV. The markers on the horizontal time axes of FIG. 5 (a) are separated by 200 μsec, and by 20 μsec in FIG. 5(b). In FIGS. 5(a) and (b), P1, P2, P3, and P4 are peak voltages generated by switching and are regions that do not correspond to the ripple of the output voltage Vout.

As shown in FIGS. 5(a), the ripple of the output voltage Vout' for the conventional converter can be about 30 mV, and the ripple of the output voltage Vout for the converter having the group frequency of 37 kHz in an embodiment of the present invention can be about 2 mV.

Hence, the converter and its driving method in embodiments of the present invention do not generate audible noise and limit the output voltage ripple.

While this invention has been described in connection with specific embodiments, it is to be understood that the invention is not limited to the disclosed embodiments, but, on the contrary, is intended to cover various modifications and equivalent arrangements included within the spirit and scope of the appended claims.

What is claimed is:

1. A converter comprising:
a main switch;
a power supply, configured to generate an output voltage by a switching operation of the main switch and by using an input voltage, and to transmit power to a load;
a current sensor, configured to sense a current flowing to the main switch to generate a sense voltage;
a burst mode controller, configured to control a burst mode group frequency by using a first voltage corresponding to a current transmitted to the load and a sawtooth waveform signal having a first frequency, wherein the burst mode controller is configured to determine a start and an end of a period for generating the switching operation according to the result of comparing the first voltage and the sawtooth waveform signal; and
a PWM controller, configured to control the turn-on timing of the main switch, and to determine the turn-off of the main switch by using the first voltage and the sense voltage, thus controlling the switching operation of the main switch.

2. The converter of claim 1, wherein
the burst mode controller includes an oscillator, configured to generate the sawtooth waveform signal; and
the burst mode controller is configured to generate the first voltage by using a result of integrating the difference between a second voltage corresponding to the output voltage and a reference voltage, and to generate a burst mode control signal according to the result of comparing the first voltage and the sawtooth waveform signal.

3. The converter of claim 2, wherein the burst mode controller comprises:
a first resistor having a first terminal connected to the output terminal;
a second resistor having a first terminal connected to a second terminal of the first resistor;
a trans-conductance amplifier, configured to receive a voltage at a node where the first resistor and the second resistor are coupled, and the reference voltage; and
a first comparator, configured to receive the first voltage and the sawtooth waveform signal, to compare the first voltage and the sawtooth waveform signal, and to generate the burst mode control signal according to the comparison result.

4. The converter of claim 3, wherein the burst mode controller comprises:
a capacitor having a first terminal connected to an output terminal of the trans-conductance amplifier; and
a third resistor having a first terminal connected to a second terminal of the capacitor and a grounded second terminal.

5. The converter of claim 2, wherein the PWM controller comprises:
a logical operator, configured to perform a logical operation on the burst mode control signal and a pulse signal to generate a first signal;
an on-time pulse generator, configured to generate the pulse signal;
a second comparator, configured to receive the first voltage and the sense voltage, and to generate a second signal according to the result of comparing the first voltage and the sense voltage; and
an SR flip-flop, configured to receive the first signal through a set terminal and the second signal through a reset terminal, and to generate a gate driver control signal according to logical values of the first signal and the second signal.

6. The converter of claim 5, wherein
the first voltage is less than a peak of the sawtooth waveform signal, and a frequency of the pulse signal that is generated for a first period in which the sawtooth waveform signal is less than the first voltage, is essentially equal to the frequency of a pulse signal that is generated for another period excluding the first period.

7. The converter of claim 5, wherein the PWM controller further comprises a gate driver, configured to determine the on/off of the main switch according to the gate driver control signal.

8. The converter of claim 7, wherein
the SR flip-flop is configured to generate a gate driver control signal for turning on the main switch when the first signal is at a second level, and to generate a gate driver control signal for turning off the main switch when the second signal is at a third level.

9. The converter of claim 8, wherein
the first level, the second level, and the third level are a high level, and the logical operator is configured to perform an AND logical operation.

10. The converter of claim 5, wherein the current sensor comprises:
a sensor, configured to sense the current flowing to the main switch;
a slope compensation/offset voltage unit, configured to generate a slope compensation and offset voltage; and
an adder, configured to sum the offset voltage and a voltage corresponding to the current flowing to the main switch to generate the sense voltage.

11. A method for driving a converter for converting an input voltage into an output voltage by a switching operation of a main switch, the method comprising:
a) controlling a switching-on period and a switching-off period in the burst mode by using a first voltage corresponding to the output voltage and a sawtooth waveform signal having a first frequency;
b) controlling the main switch to be turned on at least for a first period during the switching on period;
c) sensing a first current flowing to the main switch; and
d) comparing a sense voltage corresponding to the first current and a first voltage corresponding to the output voltage, and determining whether to turn off the main switch;
wherein step b) comprises performing a logical operation on a burst mode control signal corresponding to the result of comparing the first voltage and the sawtooth waveform signal and a pulse having an enable level for the first period.

12. The method of claim 11, wherein step a) comprises:
amplifying a difference between a reference voltage and a voltage that is generated by dividing the output voltage to generate the first voltage; and
identifying the switching-on period and the switching-off period of the burst mode according to the result of comparing the first voltage and the sawtooth waveform signal.

13. The method of claim 11, wherein step c) comprises
generating the sense voltage by adding an offset voltage to a voltage corresponding to the current flowing to the main switch.

14. The method of claim 13, wherein step d) comprises
comparing the first voltage and the sense voltage to determine whether to turn off the main switch.

* * * * *